United States Patent
Hieda

(10) Patent No.: US 6,204,878 B1
(45) Date of Patent: *Mar. 20, 2001

(54) IMAGE PICKUP DEVICE HAVING INTERLACING CIRCUITRY

(75) Inventor: Teruo Hieda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/907,636

(22) Filed: Aug. 8, 1997

Related U.S. Application Data

(62) Division of application No. 08/714,501, filed on Sep. 16, 1996, now Pat. No. 5,712,680, which is a continuation of application No. 08/359,815, filed on Dec. 20, 1994, now abandoned.

(30) Foreign Application Priority Data

Dec. 24, 1993 (JP) .................................................. 5-327079

(51) Int. Cl.⁷ .................................................. H04N 5/225
(52) U.S. Cl. ............................................ 348/220; 348/322
(58) Field of Search ..................................... 348/207, 311, 348/317, 319, 320, 321, 322, 323, 324, 714, 715, 718, 571; H04N 5/345

(56) References Cited

U.S. PATENT DOCUMENTS

| | | | | |
|---|---|---|---|---|
| 4,996,600 | * | 2/1991 | Nishida et al. | 348/322 |
| 5,119,195 | * | 6/1992 | Christopher | 348/322 |
| 5,579,047 | * | 11/1996 | Yamagami et al. | 348/322 |

FOREIGN PATENT DOCUMENTS

| | | | |
|---|---|---|---|
| 0497221 | 8/1992 | (EP) | H04N/5/21 |
| 0540102 | 5/1993 | (EP) | H04N/5/21 |
| 2221117A | 1/1990 | (GB) | H04N/5/21 |
| 62-195983 | 8/1987 | (JP) | H04N/5/335 |
| 4068880 | 7/1990 | (JP) | H04N/5/335 |
| 5-130645 | 5/1993 | (JP) | H04N/11/20 |

* cited by examiner

Primary Examiner—Tuan Ho
(74) Attorney, Agent, or Firm—Fitzpatrick, Cella, Harper & Scinto

(57) ABSTRACT

For obtaining both still and moving images in satisfactory manner in an image pickup device, in addition to a circuit for generating a moving image, frame recursive filters 18, 19, 20 and an interface circuit 21 are provided for generating a still image. Wide-band color signals R, G, B generated from the signals obtained from the CCD are subjected to a filtering process in the frame recursive filters 18, 19, 20 and the image retained in the filters 18, 19, 20 as a result of the filtering process is released as a still image under the control by the interface circuit 21. Thus the still and moving images can be generated respectively according to the required characteristics, without color blotting or color aberration and without deterioration in the color reproducibility and in the S/N ratio.

4 Claims, 2 Drawing Sheets

IMAGE PICKUP DEVICE HAVING INTERLACING CIRCUITRY

This application is a division of Application Ser. No. 08/714,501 filed Sep. 16, 1996, now U.S. Pat. No. 5,712,680, which is a Continuation Application Ser. No. 08/359,815 filed Dec. 20, 1994, now abandoned.

BACKGROUND OF THE INVENTION

1. Field of the Invention

The present invention relates to an image pickup device, and more particularly to such a device adapted for obtaining both moving image and still images.

2. Related Background Art

There have been proposed various video cameras, for obtaining a video signal by processing a signal released from an image sensor device. Among these, the color video camera in a single element system, providing a color image signal with a single image sensor element, is widely used, principally for consumer use because of its advantages such as compactness and low cost.

The above-mentioned color video camera in a single element system is provided with fine color filters on an image sensor element, for photoelectric conversion of the object image after color separation, and the video signal is obtained by separating color signals from the photoelectrically converted signal, through appropriate signal processing such as synchronized detection.

On the other hand, there have also been proposed various devices, generally called still video cameras, for obtaining a color still image with a similar image sensor element, and several systems are employed for such still video cameras.

For example there is already known a system of storing the image of one frame in succession in a memory, among the images generated in a similar manner as the above-mentioned single-element color camera, and, at the reproduction, reading the thus stored image in continuous manner for output as a still image.

Also there is known another system of storing a taken image in a memory after digitization, and reading the thus stored image by a CPU for example of an externally connected personal computer for conversion into a digital still image by a predetermined process by the CPU.

FIG. 1 shows an example of the configuration of a conventional video camera as explained above.

In such a video camera, an unrepresented object image, guided to an image sensor element (CCD) 51 through an unrepresented phototaking optical system, is subjected to photoelectric conversion by the photosensor face of the CCD 51.

The signal charges obtained by the photoelectric conversion in the respective pixels are subjected to successive additions in two pixels adjacent in the vertical direction for interlacing, and are supplied to a sample hold circuit 52 in response to CCD driving pulses PDR generated by a timing signal generating circuit 55.

In the sample hold circuit 52, the signal charges of the respective pixels supplied from the CCD 51 are made continuous in response to sampling pulses PSH generated by the timing signal generating circuit 55, and such continuous image signal is supplied to a signal processing circuit 53 to generate a video signal through a predetermined process.

The video signal thus generated is fetched and stored, for each frame, in a memory 54, and such a video signal of a frame, stored in the memory 54, is released as a still image in the reproducing operation.

In still another system, the video signal generated in the same manner as in the foregoing system is digitized by an A/D converter provided in the signal processing circuit 53, and is then stored in the memory 54.

The video signal thus stored in the memory 54 is read for example by an externally connected unrepresented personal computer and is subjected to a predetermined process by the CPU therein, whereby said video signal is converted into a digital still image.

In the above-explained conventional examples, however, the video signal obtained through a predetermined process is handled as the moving image, and each frame of said video signal is taken into a memory and is regarded as the still image. For this reason, the different characteristics, required respectively for the moving image and the still image, have not been sufficiently satisfied.

For example, in generating a moving image, gamma correction is conducted for compensating the characteristics of the cathode ray tube for television reception, but such gamma correction is not conducted in generating a still image for computer display or for printed reproduction. Also the band-width of the color signals is about 0.5 MHz in case of a moving image, but is preferably wider for a still image.

Because such requirements cannot be satisfied, the above-mentioned conventional examples tend to result in color blotting in the obtained image or in deterioration of the tonal rendition. Also the device inevitably becomes very complex and expensive because the corrected image signal has to be corrected again. Furthermore the correction of the image signal may result in generation of pseudo contours and in deterioration of the color reproducibility or the S/N ratio.

SUMMARY OF THE INVENTION

In consideration of the foregoing, the object of the present invention is to enable generation of a still image and a moving image, both in satisfactory manner.

The above-mentioned object can be attained, according to an embodiment of the present invention, by an image pickup device for generating an image, based on a signal released from an image sensor element, comprising moving image generation means for generating a moving image according to the characteristics required therefor, and still image generation means for generating a still image according to the characteristics required therefor, based on the signal released from the image sensor element.

Also according to the present invention, there is provided an image pickup device provided with an image sensor element releasing signals of all the pixels in succession in a field period, and adapted to generate a moving image based on the signals released from said image sensor element, comprising still image generation means including coincidence/interlace means for synchronizing and interlacing the signals of plural lines, utilizing the signals from the image sensor element; a frame recursive filter for effecting a filtering process on a color signal of a wide bandwidth generated from the signal released from the coincidence/interlace means; and control means for reading the image signal, retained in the frame recursive filter, in response to an instruction given by an external equipment.

The embodiment of the present invention, being composed of the technical means mentioned above, can generate both the still image and the moving image. Consequently the still image, for example, is generated utilizing a wide bandwidth for the color signals, so that there can be prevented drawbacks in the still and moving images, such as color blotting, color aberration or deterioration in the color reproducibility.

Other objects of the present invention, and the features thereof, will become fully apparent from the following detailed description of the preferred embodiments, to be taken in conjunction with the attached drawings.

DETAILED DESCRIPTION OF THE PREFERRED EMBODIMENTS

Now the present invention will be clarified in detail by an embodiment thereof shown in the attached drawings.

Figure 1:
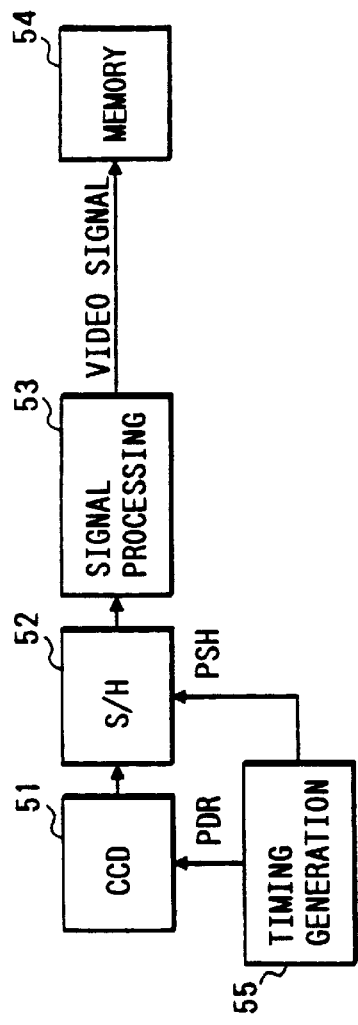
FIG. 1 is a block diagram showing the configuration of a conventional video camera.
Figure 2:
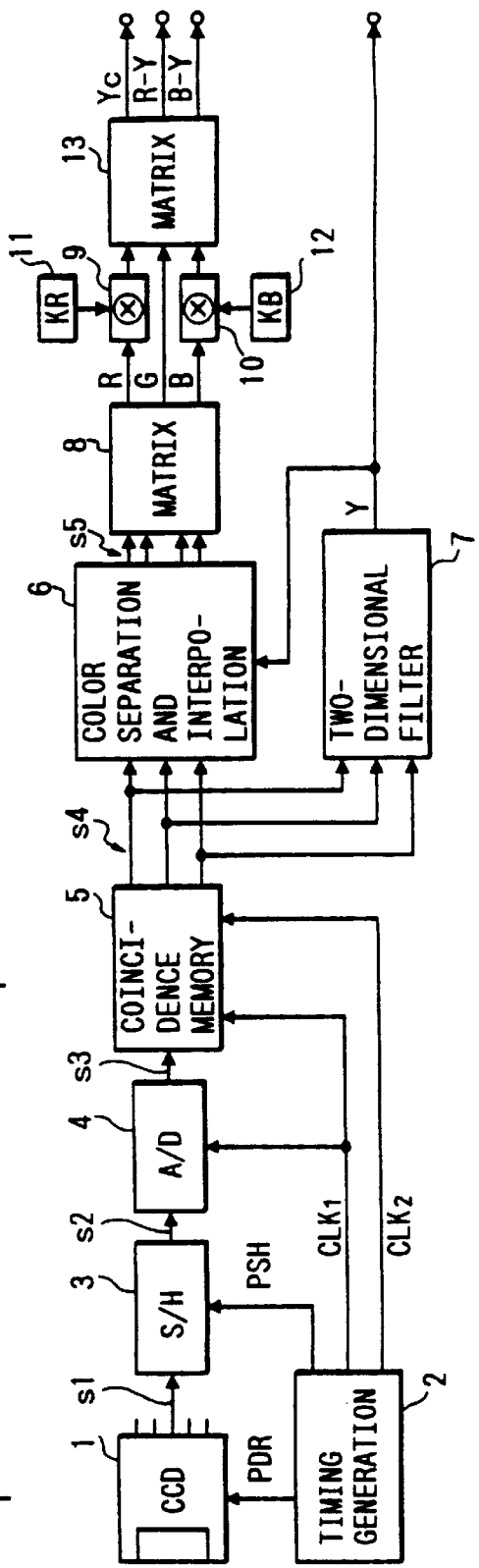
FIGS. 2 and 3 are block diagrams showing parts of the configuration of an image pickup device embodying the present invention.
Figure 3:
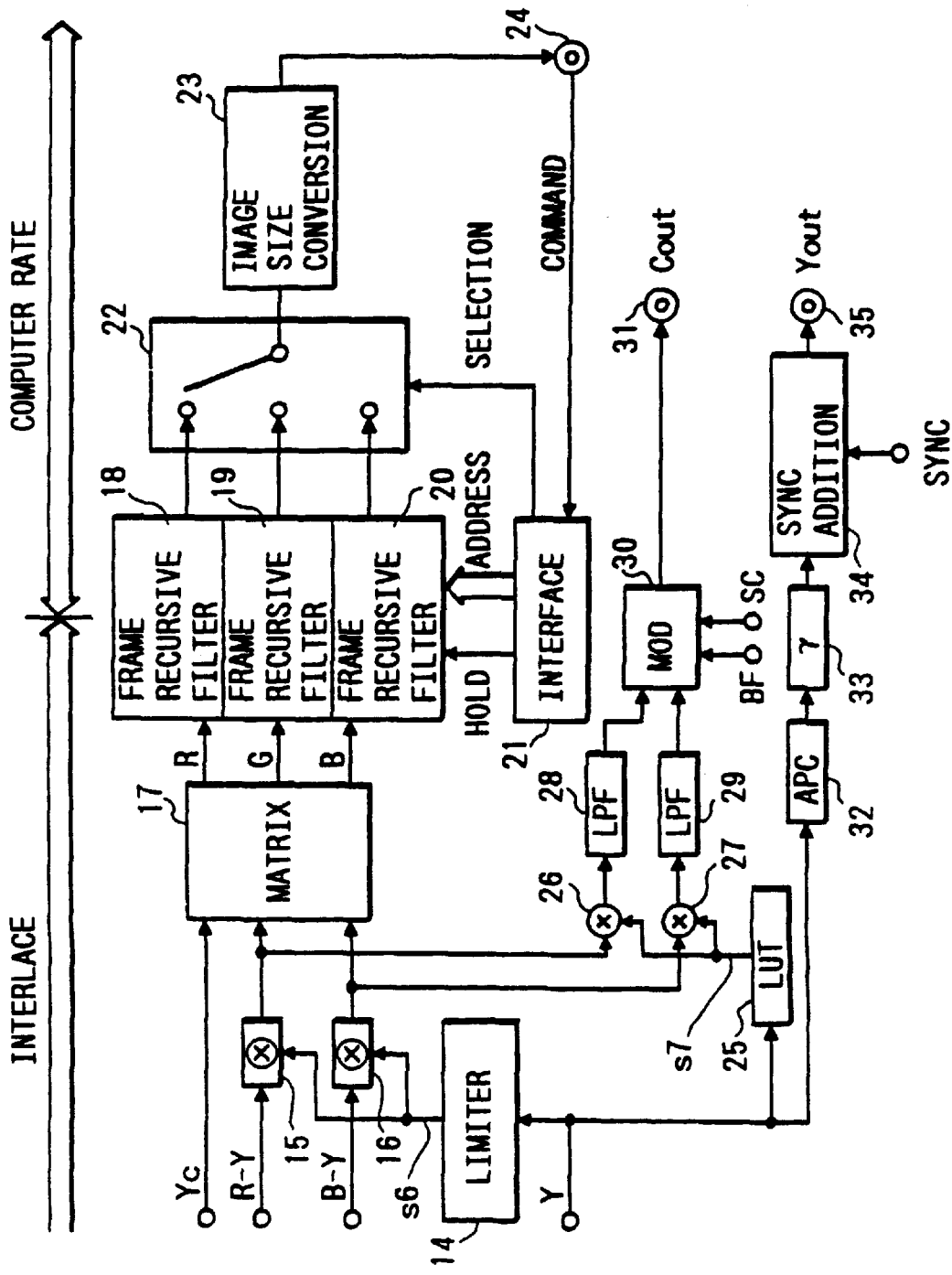

FIGS. 2 and 3 are block diagrams showing the configuration of an image pickup device embodying the present invention.

A CCD 1, being provided with fine color filters on the image sensor surface thereof, is used as a color image sensor element. The CCD 1 is of a type in which the signal charges obtained by image taking operation in respective pixels are released in succession without addition within the element.

The image sensor element is not limited to a CCD, but can also be composed of an XY-addressable device or an image taking tube.

A timing signal generating circuit 2 generates timing signals required for the CCD 1 and a sample hold circuit 3, an A/D converter 4 and a coincidence memory 5 to be explained later. The sample hold circuit 3 is used for converting signals s1 of the pixels from the CCD 1 into continuous form, in response to sampling pulses PSH supplied from the timing signal generating circuit 2.

The A/D converter 4 is used for digitizing an input analog signal s2, in response to clock pulses $CLK_1$ supplied from the timing signal generating circuit 2. The coincidence memory 5 is used for accumulating an image signal s3 supplied from the A/D converter 4 and for simultaneous readout of the accumulated image signal by three lines at a time.

A color separation/interpolation circuit 6 separates color signals, respectively corresponding to the color filters of the CCD 1, from an image signal s4 entered from the memory 5 through an appropriate process such as synchronized detection, and at the same time interpolates said separated color signals, utilizing a luminance signal Y entered from a two-dimensional filter 7 to be explained later, thereby generating color signals of a wide band.

The two-dimensional filter 7 effects two-dimensional filtering on an image signal s4 from the memory 5, thereby two-dimensionally removing the color signal components and obtaining the above-mentioned luminance signal Y. A matrix circuit 8 generates primary color signals R, G, B from color signals s5 supplied, respectively corresponding to the color filters of the CCD 1, from the color separation/interpolation circuit 6.

Multipliers 9, 10 are used for multiplying predetermined coefficients KR, KB retained in registers 11, 12 respectively with the signals R, B supplied from said matrix circuit 8. A matrix 13 generates a luminance signal Yc and color difference signals R-Y, B-Y from said primary color signals R, G, B.

A limiter 14 is so designed as to reduce the output in case the luminance signal Y from the two-dimensional filter 7 exceeds a predetermined level. Multipliers 15, 16 are provided for respectively multiplying the color difference signals R-Y, B-Y from said matrix circuit 13 with a suppressing signal s6 from said limiter 14. A matrix circuit 17 generates again the primary color signal R, G, B from the luminance signal Yc supplied from said matrix circuit 13 and the color difference signals R-Y, B-Y supplied from the multipliers 15, 16.

Frame recursive filters 18, 19, 20 respectively mix the primary color signals R, G, B supplied from the matrix circuit 17 and the immediately preceding primary color signals R, G, B stored in respective internal memories, with a predetermined ratio and store thus mixed signals in the internal memories. Thus, these frame recursive filters constitute low-pass filters in the time-axis direction.

An interface circuit 21 controls the above-mentioned frame recursive filters 18, 19, 20 and the function of a selector switch 22 to be explained later, in response to a command to be given by an external equipment such as a computer. The selector switch 22 selectively releases one of the primary color signals R, G, B supplied from the frame recursive filters 18, 19, 20 in response to a selection signal from the interface circuit 21.

An image size conversion circuit 23 converts, by an interpolation process in the horizontal direction, the image size corresponding to the number of pixels of the CCD 1 into an image size corresponding to the number of pixels of an external equipment, such as a computer. An external connection terminal 24 is used for connecting the image pickup device of this embodiment with the external equipment such as a computer and for releasing image data from the image pickup device to the external equipment or receiving control commands from the external equipment.

A look-up table (LUT) 25 releases predetermined data s7 stored in advance, in response to the luminance signal Y supplied from the two-dimensional filter 7. Multipliers 26, 27 are provided for multiplying the color difference signals R-Y, B-Y supplied from the above-mentioned multipliers 15, 16 with the predetermined data s7 supplied from the look-up table 25.

There are also provided low-pass filters (LPF) 28, 29 having a color signal bandwidth of ca. 0.5 MHz; a modulator (MOD) 30 for modulating the color signals, together with a burst flag signal BF, by a color subcarrier SC; a color output terminal 31 for releasing a chroma signal (C signal) for example to an external television monitor; and an aperture correction circuit (APC) 32 for effecting edge enhancement on the luminance signal Y supplied from the two-dimensional filter 7.

Also provided are a gamma correction circuit 33 for effecting gamma correction on the luminance signal supplied from the aperture correction circuit 32; a SYNC addition circuit 34 for adding a synchronization signal SYNC to the luminance signal supplied from the gamma correction circuit 33; and a luminance output terminal 35 for releasing, simultaneously with the output of the chroma signal from the above-mentioned color output terminal 31, the luminance signal, after the addition of the synchronization signal SYNC by the SYNC addition circuit 34, for example to an external television monitor.

In the following there will be explained the function of the image pickup device of the above-explained configuration.

At first the unrepresented object image, guided through the unrepresented phototaking optical system to the CCD 1, is subjected to color separation by the fine color filters provided on the photosensor face of the CCD 1 and to photoelectric conversion in the photosensor face. The signal charges of the respective pixels, obtained by said photoelectric conversion are read, in response to the CCD driving pulses PDR generated by the timing signal generating circuit 2, and are given to the sample hold circuit 3.

In the ordinary image sensor element, such signal charge read-out is conducted after the addition of the signal charges of two pixels adjacent in the vertical direction, in order to obtain an output corresponding to interlacing. In contrast, in the image sensor element of the present embodiment, the signal charges of all the pixels are read in succession, without such addition of the signal charges.

Consequently, in order to read the signal charges of all the pixels within one vertical period (1V), the sampling frequency for the signal released from the CCD 1 is selected to be twice the sampling frequency in the ordinary driving method, so that the signal charges of a line are read with a period of 0.5 H.

In this manner the resolution, in the vertical direction, of the signal released from the CCD 1 can be improved. Also the addition of the color signals afterwards prevents the deterioration of the color S/N ratio resulting from the loss in the level of signal modulation by the colors, or the formation of vertical pseudo color signals in case the luminance level varies in the vertical direction.

The CCD 1 of the present embodiment may be composed, instead of the image sensor element releasing the signal charges in the above-explained manner, of an image sensor element from which the signal charges of two horizontal lines can be simultaneously read through two output terminals.

The signal charges s1 of the respective pixels, read from the CCD 1 in the above-explained manner, are made continuous by the sample hold circuit 3, in response to the sampling pulses PSH generated by the timing signal generation circuit 2. Then, thus obtained continuous analog image signal s2 is converted into the digital image signal s3 by the A/D converter 4, in response to the clock pulses $CLK_1$ generated by the timing signal generation circuit 2.

The image signal s3 is supplied to the coincidence memory 5, from which the signals of three lines are read in simultaneously manner. In this operation, the simultaneous signals are read with an aberration of 0.5 lines in the vertical direction at every period of two fields, in response to clock pulses $CLK_1$, $CLK_2$ supplied from the timing signal generation circuit 2, whereby an interlaced image signal s4, in which signals of three lines are synchronized, can be obtained from the memory 5.

The foregoing description assumes that the signals of three lines are synchronized, but such synchronization may be made on a larger number of lines (for example 5 or 7 lines).

The image signal s4 from the memory 5 is at first supplied to the two-dimensional filter 7, which effects a two-dimensional filtering process, utilizing the image signal s4 of three lines, thereby eliminating the color carrier components in the horizontal and vertical direction, generated by the color filters provided on the CCD 1, and generating the luminance signal Y.

On the other hand, the image signal s4 of three lines from the memory 5 is supplied also to the color separation/interpolation circuit 6, which separates color signals corresponding to the color filters provided on the CCD 1, by a process such as synchronized detection. At the same time, the separated color signals are interpolated, in the high frequency components, by the luminance signal Y supplied from the two-dimensional filter 7, whereby wide-band color signals are generated.

It is thus rendered possible to a significantly expand the bandwidth of the color signals of the still image, and to obtain a same group delay amount for the color signals in the horizontal and vertical direction. Therefore, such wide-band color signals can provide a still image with reduced color blotting and color aberration.

Then the color signals s5 released from the color separation/interpolation circuit 6 are converted, in the matrix circuit 8, into the primary color signals R, G, B. Among these primary color signals, the R signal is subjected to gain adjustment by a variable-gain circuit composed of the multiplier 9 and the register 11, and the B signal is also subjected to gain adjustment by a variable-gain circuit composed of the multiplier 10 and the register 12.

The coefficients KR, KB stored respectively in the registers 11, 12 are adjusted, for example by an unrepresented external adjuster, in such a manner that, in phototaking of a white object, the level of the R signal from the multiplier 9, that of the G signal from the matrix circuit 8 and that of the B signal from the multiplier 10 become 1:1:1. It is thus made possible to correct the aberration in the white balance, resulting for example from the color temperature of the illuminating light for the object, without deterioration in the color reproducibility.

The primary color signals R, G, B after the above-mentioned gain control are converted, in the matrix circuit 13, into the luminance signal Yc and the color difference signals R-Y, B-Y. The luminance signal Yc is different, in the ratio of the constituting color components, from the luminance signal Y generated by the two-dimensional filter 7.

More specifically, the ratio of the constituting color components of the luminance signal Y generated by the two-dimensional filter 7 is determined by the average transmittances of the fine color filters provided on the image sensor face of the CCD 1. The average transmittances usually have a larger proportion of the G signal, in comparison with the R and B signal components, but the ratio thereof is aberrated from the ratio 0.3:0.59:0.11 specified in the NTSC (National Television System Committee) standards. Also the color component ratio of the luminance signal Y also varies by the color component ratio of the illuminating light source for the object.

On the other hand, the color component ratio of the luminance signal Yc generated by the matrix circuit 13 is determined by the coefficients of said matrix, and the coefficients are so determined that the color component ratio of the luminance signal Yc exactly coincides with the ratio specified in the above-mentioned NTSC standards.

The present embodiment can avoid deterioration of the color reproducibility resulting from the aberration in the color component ratio of the luminance signal, as it employs, in the still image generation, the luminance signal Yc of the color component ratio coinciding with the ratio specified in the NTSC standards.

The color difference signals R-Y, B-Y generated by the matrix circuit 13 are respectively supplied to input terminals of the multipliers 15, 16, of which the other input terminals receive the suppressing signal s6 released from the limiter 14.

The limiter 14 is so designed as to decrease its output in case the luminance signal Y supplied from the two-dimensional filter 7 exceeds to a predetermined luminance level. Thus the limiter 14 releases the suppressing signal s6, functioning to suppress the color signals in the high luminance area, and the color difference signals R-Y, B-Y are multiplied by said suppressing signal s6 in the multipliers 15, 16 to achieve gain control of said color signals.

The above-mentioned gain control of the color difference signals R-Y, B-Y is based on the following reason.

In the image signal s3 released from the A/D converter 4, one of the color signals may become saturated in an area where the object is of a high luminance, because of the saturation characteristics of the CCD 1 or the A/D converter 4. In such case, the color reproducibility becomes deteriorated to generate so-called false color, only in such high luminance area.

Therefore, the suppressing signal s6, corresponding to the false color, is generated in the limiter 14, and the generation of the false color signals is suppressed by multiplying the color difference signals R-Y, B-Y with the suppressing signal s6 in the multipliers 15, 16.

The above-mentioned gain control on the color difference signals R-Y, B-Y minimizes the variation in the hues resulting from correction, and also provides an advantage of generating completely white color, without any color component left, when said false color signals are suppressed most strongly. It is also possible to vary the characteristics according to the object scene or the purpose of use, by rendering the characteristics of the limiter 14 variable.

Subsequently, the luminance signal Yc, and the color difference signals R-Y, B-Y generated in the above-explained manner are supplied to the matrix circuit 17 for re-conversion into the primary color signals R, G, B, which are respectively supplied to the frame recursive filters 18, 19, 20.

In the frame recursive filters 18, 19, 20, when a hold signal HOLD supplied from the interface circuit 21 is at the low level state, there are repeated operations of mixing the input primary color signals R, G, B with the immediately preceding primary color signals R, G, B, stored in the respective internal memories, with a predetermined mixing ratio, and storing thus mixed signals in the internal memories. In this manner there is formed a low-pas filter in the direction of time-axis and the random noise can be suppressed.

On the other hand, when the hold signal HOLD from the interface circuit 21 is shifted to the high level state by a command from the external equipment connected to the external connection terminal 24, the above-explained operation is terminated and the immediately preceding primary color signals R, G, B are retained. In this state, there can be obtained the signals of a frame resolution, if the frame recursive filters 18, 19, 20 are in the frame operation mode.

In the above-mentioned mixing of the input image signals and the image signals in the internal memories, there may be employed an adaptive processing by detecting the difference of both image signals and increasing the mixing proportion of the input image signals in case the difference is large, in order to reduce the image blur for a moving image. Also the mixing ratio may be made externally adjustable, according to the purpose.

Subsequently, when an address signal is set by the interface circuit 21 in response to a command from the above-mentioned external equipment, the frame recursive filters 18, 19, 20 release the stored data, corresponding to the address signal, as the image data. Among thus released image data, those of a color selected by the selector switch 22 are supplied to the image size conversion circuit 23.

The data selected by the selector switch 22 in the above-explained manner have an image size corresponding to the number of pixels of the CCD 1. The image size conversion circuit 23 effects interpolation in the horizontal direction, thereby converting the image size of the input data into an image size matching the external equipment connected to the external connection terminal 24.

For example, if the CCD 1 has 768 pixels in the horizontal direction, each pixel is vertically somewhat oblong. On the other hand, the external equipment such as computer usually uses square pixels, so that the pixel size has to be regulated to a square shape. The pixels become square by skipping the pixels in the horizontal direction to 640 pixels, but a simple skipping operation will result in a distortion.

Such a drawback can however be alleviated by dividing the horizontal pixels of the CCD 1 into 128 blocks of 6 pixels each, 128 being the largest common divisor of 768 and 640, and reducing the number of pixels to 640 by a linear interpolation for forming 5 pixels out of 6 pixels in each block. Also an interpolated image with even less distortion can be obtained by a second- or higher-order interpolation.

The data, subjected to the image size conversion by the horizontal interpolation in the image size conversion circuit 23 are supplied, as a still image, to the external equipment such as a computer, through the terminal 24.

In such formation of the still image for the external equipment, the interface circuit 21 generates, as explained above, the hold signal and the address signal for controlling the frame recursive filters 18, 19, 20 and the selection signal for the selector switch 22, in response to the command from the external equipment. These signals are used for controlling the functions of the frame recursive filters 18, 19, 20 and of said selector switch 22, thereby supplying the external equipment with necessary data.

On the other hand, the color difference signals R-Y, B-Y obtained from the multipliers 15, 16 are also supplied, respectively, to input terminals of the multipliers 26, 27, of which the other input terminals receive a predetermined data s7 released from the look-up table 25.

Said signal s7 from the look-up table 25 is obtained, from the data stored therein in advance, according to the level of the luminance signal Y supplied from the two-dimensional filter 7. The signal s7 is multiplied, in the multipliers 26, 27, on the color difference signals R-Y, B-Y to control the amplitudes thereof.

The look-up table 25 is so constructed that the data stored therein become larger or smaller respectively where the level of the input luminance signal Y is lower or higher. Consequently, the multiplication of such signal s7 with the color difference signals R-Y, B-Y achieves gamma correction thereon.

The color difference signals R-Y, B-Y obtained from the multipliers 26, 27 are subjected, respectively in the LPF 28, 29, a band limitation to ca. 0.5 MHz, which is the bandwidth of the color signals of a moving image. Then, thus band-limited color difference signals are modulated, together with the burst flag signal BF, by the color sub-carrier SC in the modulator 30 to obtain a chrominance signal, which is supplied, through a color output terminal 31, as the color signal of the moving image, to the external equipment.

The luminance signal Y from the two-dimensional filter 7 is supplied also to the aperture correction circuit 32 for enhancement of the high-frequency signals in the horizontal and vertical directions, and is then subjected to gamma correction in the gamma correction circuit 33 and the addition of the synchronization signal SYNC in the SYNC addition circuit 34. The luminance signal thus obtained is supplied as the luminance signal of the moving image to the external equipment, simultaneously with the release of the chrominance signal from the color output terminal 31.

As explained in the foregoing, the present embodiment, generating the moving image and the still image in different routes, can generate the moving image and the still image based on respectively required characteristics, so that both images can be formed with satisfactory image quality.

In the above-explained embodiment, a knee correction circuit for compressing the primary color signals R, G, B exceeding a standard signal level may be inserted in front of the matrix circuit 13. Such configuration permits reducing the magnitude of circuitry as the signal range is reduced after the correction circuit, and also to simplify the process as the range matching becomes unnecessary after the image data are fetched in the computer or the like.

In the above-explained embodiment, the color difference signals R-Y, B-Y from the multipliers 15, 16 are respectively supplied to the input terminals of the multipliers 26, 27, but the present invention is not limited to such form.

It is also possible to effect gamma correction on each of the primary color signals R, G, B obtained from the matrix circuit 8 and the multipliers 9, 10, then to generate the color difference signals R-Y, B-Y by another matrix similar to the matrix circuit 13, and to supply input terminals of the multipliers 26, 27 respectively with thus generated color difference signals R-Y, B-Y.

Also the other input terminals of the multipliers 26, 27 may receive the signal s6 from the limiter 14, instead of the signal from the look-up table 25. Such a method enables exact gamma correction also on the color signals of a moving image, so that the color reproducibility of the moving image can be improved.

It is also possible to add the contour component of the image, detected by the aperture correction circuit 32, after gain adjustment, to the primary color signals R, G, B supplied to the matrix circuit 13. Such a configuration permits enhancing the contour of the still image, when necessary.

As explained in the foregoing, the present invention, being provided with moving image generation means for generating a moving image and still image generation means for generating a still image in mutually separate manner, can form both images respectively according to the required characteristics.

More specifically, in addition to the moving image generation means for generating a moving image, there are provided frame recursive filters and control means in order to generate a still image, and the wide-band color signals generated from the signals obtained from the image sensor element are subjected to a filtering process in the frame recursive filters, and the image retained in said frame recursive filters after the filtering process is released as a still image under the control by said control means. It is therefore rendered possible to generate, not only the moving image based on the required characteristics but also the still image also based on the characteristics required therefor, both images in satisfactory image quality.

What is claimed is:

1. An image pickup device provided with an image sensor element from which the signals of all the pixels are read in a non-interlaced manner, without being added together, in a field period and adapted to generate a moving image based on the signals from said image sensor element, comprising:

an A/D converter for converting a non-interlaced output of said image sensor element into a digital image signal;

interlacing means for converting said non-interlaced output from said A/D converter into different interlaced signals field-by-field;

filter means for filtering said interlaced signals with a predetermined filtering characteristic controlled by an external device; and a pixel size conversion circuit for converting a pixel size of an output of said filtering means.

2. An image pickup device according to claim 1, wherein said filter means effects a filtering process on wide-band color signals generated from the signals released from said interlacing means.

3. An image pickup device according to claim 2, further comprising:

control means for reading the image signals, retained in said filter means, in response to a command from said external device.

4. An image pickup device according to claim 2, further comprising (i) detection means for detecting characteristics of external equipment, and (ii) control means for controlling in operation of said interlacing means according to in output of said detection means.

* * * * *